United States Patent
Reed et al.

(10) Patent No.: US 7,221,677 B1
(45) Date of Patent: May 22, 2007

(54) SCALABLE APPARATUS AND METHOD FOR INCREASING THROUGHPUT IN MULTIPLE LEVEL MINIMUM LOGIC NETWORKS USING A PLURALITY OF CONTROL LINES

(75) Inventors: Coke Reed, Princeton, NJ (US); John Hesse, Moss Beach, CA (US)

(73) Assignee: Interactic Holdings, LLC, Austin, TX (US)

( * ) Notice: Subject to any disclaimer, the term of this patent is extended or adjusted under 35 U.S.C. 154(b) by 617 days.

(21) Appl. No.: 09/692,073

(22) Filed: Oct. 19, 2000

(51) Int. Cl.
*H04L 12/28* (2006.01)
*H04L 12/50* (2006.01)
*G06F 15/173* (2006.01)

(52) U.S. Cl. ............... 370/404; 370/388; 370/409; 709/238

(58) Field of Classification Search ........... 370/238, 370/236, 389, 392, 445, 447, 400–410, 388; 716/12–13; 709/238–240
See application file for complete search history.

(56) References Cited

U.S. PATENT DOCUMENTS

| | | | |
|---|---|---|---|
| 4,814,980 A * | 3/1989 | Peterson et al. | 709/216 |
| 5,416,769 A * | 5/1995 | Karol | 370/414 |
| 5,617,413 A * | 4/1997 | Monacos | 370/400 |
| 5,940,389 A * | 8/1999 | Yang et al. | 370/380 |
| 6,202,082 B1 * | 3/2001 | Tomizawa et al. | 709/201 |
| 6,272,141 B1 * | 8/2001 | Reed | 370/404 |
| 6,285,679 B1 * | 9/2001 | Dally et al. | 370/413 |
| 6,289,021 B1 * | 9/2001 | Hesse | 370/409 |
| 6,396,814 B1 * | 5/2002 | Iwamura et al. | 370/256 |
| 6,754,207 B1 * | 6/2004 | Hesse | 370/388 |
| 6,947,433 B2 * | 9/2005 | Carvey | 370/401 |

FOREIGN PATENT DOCUMENTS

WO    WO 98/33304    7/1998

OTHER PUBLICATIONS

Wong; Interconnection Network for a Field Programmable Gate Array; Aug. 22, 2002; United States Patent Application Publication.*
Reed; Multiple Level Minimum Logic Network; Sep. 13, 2001; United States Patent Application Publication.*
Chiarulli et al.; Partitioned Optical Passive Star (POPS) Multiprocessor Interconnection Networks with Distributed Control; Jul. 1996; Lightwave Technology, Journal of; vol. 14, Issue: 7; pp. 1601-1612.*
Dobosiewicz et al., "A Bounded-Hop-Count Deflection Scheme for Manhattan-Street Networks", Proceedings of IEEE Infocom 1996. Conference of the IEEE Computer and Communication Societies. Networking the Next Generation. Proceedings of Infocom. San Francisco, U.S.A. vol. 1, pp. 172-179 (Mar. 1996).

* cited by examiner

*Primary Examiner*—Chi Pham
*Assistant Examiner*—Tri H. Phan
(74) *Attorney, Agent, or Firm*—Keith D. Nowak; Carter Ledyard & Milburn LLP

(57) ABSTRACT

A network or interconnect structure which includes a plurality of nodes which are interconnected within a hierarchical multiple level structure. The level of each node is determined by the position of the node within the structure and data messages move from node to node from a source level to a destination level. Each node within the interconnect structure is capable of receiving simultaneous data messages at its input ports from any other node and the receiving node is able to transmit each of the received data messages through its output ports to separate nodes in the interconnect structure to one or more levels below the level of the receiving node.

4 Claims, 8 Drawing Sheets

NODE INTERCONNECTIONS AND CONTROL

ALTERNATE NODE INTERCONNECTIONS

NODES ON THREE LEVELS

INTERCONNECT BLOCK DIAGRAM

INTERLEVEL CONTROL SIGNALS

SCALABLE APPARATUS AND METHOD FOR INCREASING THROUGHPUT IN MULTIPLE LEVEL MINIMUM LOGIC NETWORKS USING A PLURALITY OF CONTROL LINES

RELATED PATENTS AND APPLICATIONS

This application is related to U.S. patent application Ser. No. 09/009,703, filed on Jan. 20, 1998, which is pending and is incorporated by reference in its entirety. This application is also related to and incorporates U.S. Pat. No. 5,996,020, herein by reference in its entirety.

The disclosed system and operating method are related to subject matter disclosed in the following co-pending patent applications that are incorporated herein in their entirety:

1. U.S. patent application Ser. No. 09/693,359, entitled "Scaleable Multipath Wormhole Interconnect," naming John Hesse as inventor, and filed on even date herewith.
2. U.S. patent application Ser. No. 09/693,603, entitled "Scaleable Interconnect Structure for Parallel Computing and Parallel Memory Access, naming Coke Reed and John Hesse as inventors and filed on even date herewith.
3. U.S. patent application Ser. No. 09/693,358, entitled "Scaleable Interconnect Structure Utilizing Quality of Service Handling, naming Coke Reed and John Hesse as inventors and filed on even date herewith.
4. U.S. patent application Ser. No. 09/693,357, entitled Scaleable Wormhole Routing Concentrator," naming John Hesse and Coke Reed as inventors and filed on even date herewith.

FIELD OF THE INVENTION

The present invention relates to interconnection structures for computing and communication systems. More particularly the instant invention relates to a multiple level interconnection structure having a plurality of nodes wherein each node sends messages to other nodes and each node can accommodate a plurality of simultaneous inputs and can decide where to send messages using examination of nodes located at levels more than one level below the node sending a particular message. The invention also provides a system in which latency is lower than in the prior art (described below) at the expense of a modest increase in the control logic.

BACKGROUND OF THE INVENTION

The Internet, advanced computing systems, such as massively parallel computers and advanced telecommunications systems all require an interconnection structure that reduces control and logic circuits while providing low latency and high throughput.

One such system is described in U.S. Pat. No. 5,996,020, granted to Coke S. Reed on Nov. 30, 1999, ("the Reed Patent"), the teachings of which are incorporated herein by reference. The Reed Patent describes a network and interconnect structure which utilizes a data flow technique that is based on timing and positioning of messages communicating throughout the interconnect structure. Switching control is distributed throughout multiple nodes in the structure so that a supervisory controller providing a global control function and complex logic structures are avoided. The interconnect structure operates as a "deflection" or "hot potato" system in which processing and storage overhead at each node is minimized. Elimination of a global controller and also of buffering at the nodes greatly reduces the amount of control and logic structures in the interconnect structure, simplifying overall control components and network interconnect components while improving throughput and low latency for message communication.

More specifically, the Reed Patent describes a design in which processing and storage overhead at each node is greatly reduced by routing a message packet through an additional output port to a node at the same level in the interconnect structure rather than holding the packet until a desired output port is available. With this design the usage of buffers at each node is eliminated.

In accordance with one aspect of the Reed Patent, the interconnect structure includes a plurality of nodes and a plurality of interconnect lines selectively connecting the nodes in a multiple level structure in which the levels include a richly interconnected collection of rings, with the multiple level structure including a plurality of J+1 levels in a hierarchy of levels and a plurality of $C \cdot 2^K$ nodes at each level (C is a an integer representing the number of angles). Control information is sent to resolve data transmission conflicts in the interconnect structure where each node is a successor to a node on an adjacent outer level and an immediate successor to a node on the same level. Message data from an immediate predecessor has priority. Control information is sent from nodes on a level to nodes on the adjacent outer level to warn of impending conflicts.

Although the Reed Patent is a substantial advance over the prior art it is essentially a "look one step ahead" system in which messages proceed through the interconnect structure based on the availability of an input port at a node, either at the same level as the message or at a lower level closer to the message's terminal destination. Nodes in the Reed Patent could be capable of receiving a plurality of simultaneous messages at the input ports of each node. However, in the Reed Patent, there was available only one unblocked node to where an incoming message could be sent so that in practice the nodes in the Reed Patent could not accept simultaneous input messages. The Reed Patent, however, did teach that each node could take into account information from a level more than one level below the current level of the message, thus, reducing throughput and achieving reduction of latency in the network.

A second approach to achieving an optimum network structure has been shown and described in U.S. patent application Ser. No. 09/009,703 to John E. Hesse, filed on Jan. 20, 1998. ("the Hesse Patent"). This patent application is assigned to the same entity as is the instant application, and its teachings are also incorporated herein by reference in their entirety.

The Hesse Patent describes a scalable low-latency switch which extends the functionality of a multiple level minimum logic interconnect structure, such as is taught in the Reed Patent, for use in computers of all types, networks and communication systems. The interconnect structure using the scalable low-latency switch described in the Hesse Patent employs a method of achieving wormhole routing by a novel procedure for inserting messages into the network. The scalable low-latency switch is made up of a large number of extremely simple control cells (nodes) which are arranged into arrays. The number of nodes in an array is a design parameter typically in the range of 64 to 1024 and is usually a power of 2, with the arrays being arranged into levels and columns. Each node has two data input ports and two data output ports wherein the nodes can be formed into more complex designs, such as "paired-node" designs which are combined to form larger units.

In the Hesse Patent messages are not simultaneously inserted into all the unblocked nodes on the outer cylinder of an array but are inserted simultaneously into two columns A and B of the array, only if an entire message fits between A and B. This strategy advantageously prevents the first bit of one message from colliding with an interior bit of another message already in the switch. Therefore, contention between entire messages is addressed by resolving the contention between the first bit only of two contending messages with the desirable outcome that messages wormhole through many nodes in the interconnect structure.

Although the Hesse Patent is certainly an improvement over the prior art, it is still essentially a "look one step ahead" system combined with wormhole routing. Additional improvements are possible to provide a low-latency, high throughput, interconnect structure and this invention is directed to such improvements.

It is therefore our object of the present invention to provide a high throughput, low-latency interconnect structure which utilizes the advantages of the Reed Patent and the Hesse Patent while achieving improvements over their teachings.

It is a further object of the present invention to adopt the interconnect structure shown in the Reed and Hesse Patents but add to the basic structure by improving upon the "look ahead, one step" system described in each of these patents.

It is another object of the present invention to allow each node, as described in the interconnect structure of the Reed and Hesse Patents, to function more efficiently thereby reducing latency and increasing message throughput.

It is a still further object of the present invention to improve the interconnect structure of the Reed and Hesse Patents by allowing each node to accommodate simultaneous messages at node input ports without blocking either message.

It is still another object of the present invention to provide a "look several steps ahead" system in which a node receives control information regarding other nodes on a level more than one level below the level at which the message enters a particular node.

SUMMARY OF THE INVENTION

In accordance with one embodiment of the present invention, an interconnect structure comprises a plurality of nodes with a plurality of interconnect lines selectively coupling the nodes in a hierarchical multiple level structure. The level of a node within the structure is determined by the position of the node in the structure in which data moves from a source level to a destination level or alternatively laterally along a level of the multiple level structure. Data messages are transmitted through the multiple level structure from a source node to one of a plurality of designated destination nodes.

It is a feature of the invention that each node included within said plurality of nodes has a plurality of input ports and a plurality of output ports, each node capable of receiving simultaneous data messages at two or more of its input ports.

It is a further feature of the invention that each node is capable of receiving simultaneous data messages if the node is able to transmit each of said received data messages through separate ones if it's output ports to separate nodes in said interconnect structure.

It is a still further feature of the invention that a node in the interconnect structure can receive information regarding nodes more than one level below the node receiving the data messages.

These and other objects and features of the present invention will be more fully appreciated from the following detailed description when taken in conjunction with the accompanying drawings.

DETAILED DESCRIPTION OF THE INVENTION

The present invention incorporates by reference the interconnect structure set forth in U.S. Pat. No. 5,996,020 ("the Reed Patent"), and U.S. patent application Ser. No. 09/009,703, filed on Jan. 20, 1998, ("the Hesse Patent"). In the Reed Patent nodes are arranged in a cylindrical formation and in the Hesse Patent nodes are arranged in rows and columns. Both patents also describe various types of node configurations that can be used with the interconnect structure of the present invention. It is to be understood that all aspects of the Reed and Hesse patents, both in the interconnect structure and node configuration, are applicable to the present invention.

Figure 1:
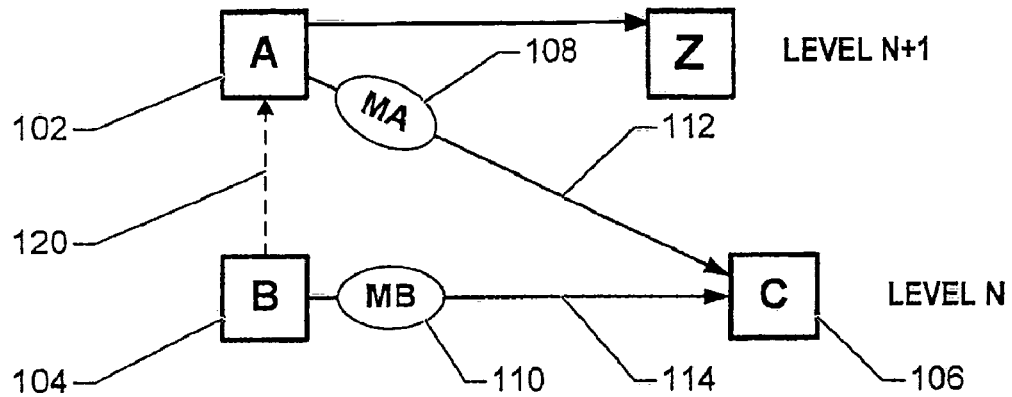
FIGS. 1 and 2 illustrate part of the interconnection structure utilized in accordance with the present invention.

Referring now to FIG. 1, there is shown an interconnect structure such as was described in the Reed Patent. Three nodes are illustrated in FIG. 1. The two nodes A, 102 and B, 104 are positioned to send messages directly to a third node C, 106. Nodes B and C are on a level N of the network and node A is on a level N+1 of the network. As described in the Reed and Hesse patents, node B has priority over node A to send data to node C. When node B sends a message MB to node C on path 114, node B sends a control signal 120 informing A of the sending of MB to C so that A does not send a message MA to C in a time period that would conflict with the message MB. If there is a path from C to a target output of MA as indicated by the header of MA and there is no blocking signal from B to A then A will route MA to C on path 112. If either of these conditions does not hold, then A will send MA to a node z distinct from C, with that node being on level N+1 of the network.

In the Reed Patent, nodes A and B are said to be at the same angle on different cylinders. In the Hesse Patent, nodes A and B are said to be in the same column on different levels.

Figure 2:
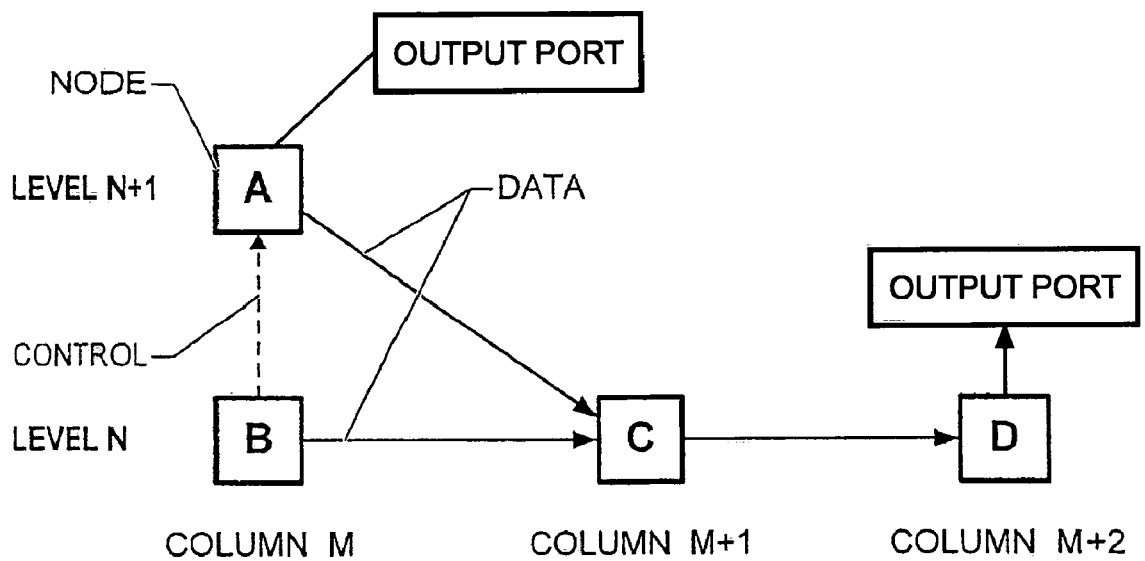

Four nodes are illustrated in FIG. 2. Nodes B, C, and D are on level N of the network and node A is on level N+1 of the network. All of the output ports of the network that can be reached from node B can also be reached from nodes C and D. There are output ports that can be reached from A that cannot be reached from C. For this reason, when a message travels from A to C the set of output ports that the message can reach is narrowed. Among all of the nodes in the network, node C has the highest priority to send messages to node D as node C is on the same level as node D. For this reason, when only one message M arrives at node C in a given time period, that message M can always travel to node D, and there is a path from D to a targeted output port. Therefore, it is not necessary to have a buffer at node C, and by the same argument buffers are not used at any other nodes. In the Reed and Hesse patents, a message MA is not allowed to travel from A to C unless the logic associated with node A is informed that B will not send a conflicting message to C. This priority of node B over node A of sending data to Node C is enforced by a control signal from B to A. In this way, A will route MA to C provided that A "wants" to send MA to C and A is not prohibited from sending MA to C by a control signal from B to A. In case FIG. 2 is a portion of a network as described in the Reed and Hesse patents, or "Scaleable Multipath Wormhole Interconnect" patent application, node A "wants" to send MA to C provided that there is a path from C to target output port of MA as specified in the header of MA. In case FIG. 2 is a portion of the interconnect structure taught in the "Scaleable Wormhole Routing Concentrator" patent application, then node A always "wants" to send MA to C because, in the case of the concentrator, all of the outputs are acceptable output ports for MA." Alternatively the Hesse Patent took advantage of the fact that only one message could arrive at node C at a given time by allowing messages from A to C to travel to C by going through node B.

Figure 3A:
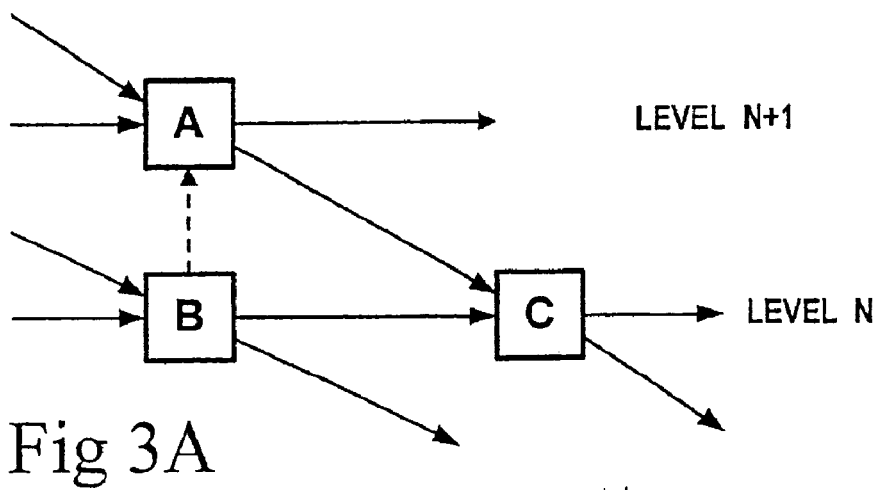
FIGS. 3A–3C illustrate alternate node connections in accordance with the present invention.

Referring now to FIG. 3A, there is shown a portion of the interconnect structure taught in the Reed Patent. In the Reed Patent only one message could enter C during a particular time interval. However, with the present invention, as described below, two simultaneous messages may be allowed to enter node C so that messages from A to C and from B to C are allowed to enter node C at the same time.

Figure 3B:
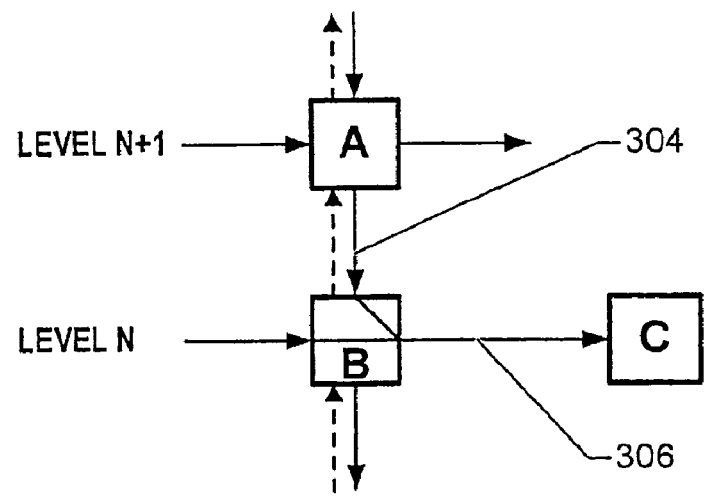
Figure 3C:
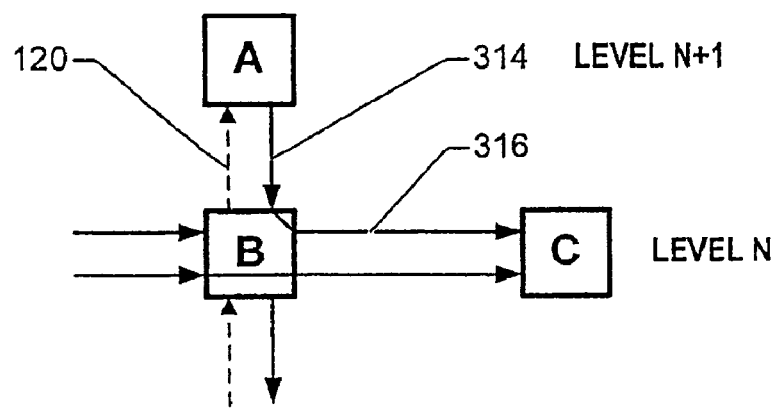

FIG. 3B illustrates a portion of the interconnect structure used in the Hesse Patent. Data path 306 accepts a message from either A or B and can transmit only a single message to C. The nodes of FIG. 3B can be modified as illustrated in FIG. 3C with an additional path 316 from node B to C so that both nodes A and B can send to C. In FIG. 3B node A uses data paths 304 and 306 to send to C; in FIG. 3C node A uses paths 314 and 316 to send to C. However the Hesse Patent, as well as the Reed Patent did not allow a particular node to accept two simultaneous messages, as is possible with the present invention. The improvements of the present invention can, however be readily applied to the Reed and Hesse configurations by changing the embodiment of 3B to the embodiment of 3C.

Figure 4:
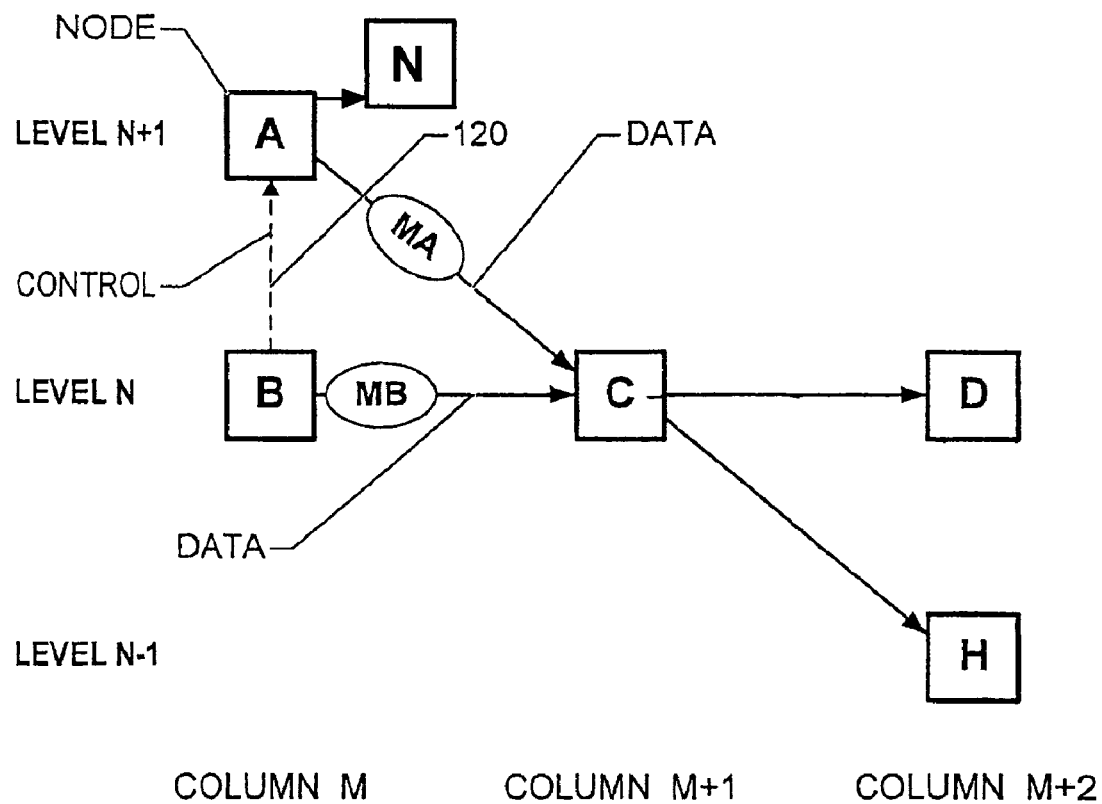
FIG. 4 illustrates three levels of an interconnect structure which is applicable for use with the present invention.

FIG. 4 illustrates a first embodiment of the present invention.

Five nodes are illustrated in FIG. 4. In addition to the four nodes shown in FIG. 2, there is a node H on level N-1. Node C is capable of sending data to node H. When node B sends a message MB to C and that message travels from C to H, then node A can send a message MA to C which will arrive at C simultaneously with the message MB. Message MA can then travel from C to D in the same time period that MB travels from C to H. The ability of a node to accept two messages at the same time is one advantage of the present invention, and is a novel improvement over the earlier Reed and Hesse patents.

Since there are no buffers at the node C, when two messages MA and MB arrive at C concurrently, one of the two messages must travel to H and one of the two messages must travel to D. In the present embodiment, MB is free to travel to H allowing MA to travel to D. In case the two messages MA and MB both travel to C, then the logic at C routes one of MA and MB to H and the other of MA and MB to D. In one strategy node C sends MB from C to H and MA from C to D, as illustrated in FIG. 6B. This strategy is simple because it is always possible and, because B is on a lower level than A in the structure, MB has probably been in the structure longer than MA. In another embodiment, the routing of messages by C can depend upon quality of service (QOS). In this embodiment a part of the header contains quality of service information so that when MA and MB travel to C, then C will route MB to H and MA to D unless the QOS level of MA is higher than the QOS level of MB in which case, C will route MA to H and MB to D, as illustrated in FIG. 6C. In this way, messages with higher levels of QOS are able to obtain priority over messages with lower levels of QOS.

In the Reed and Hesse patents, a control signal 120 (FIG. 1) was sent to node A from B informing A whether or not A is blocked from sending a message to C. This blocking was guaranteed not to take place if B was not sending a message to C. In the Reed and Hesse patents, A was not allowed to send a message to C if, in the same time period, B sent a message to C. With the present invention, A is allowed to send a message to C in the same time period that B sends a message to C if the message from B to C is guaranteed not to use the line from C to D, but instead uses the line from C to H. (See FIG. 4).

Logic associated with node A is capable of routing a message MA to node C. There is at least one additional node N, so that the logic associated with node A is capable of routing MA to N. In case A routes MA to C, then logic associated with node C is capable of routing MA to nodes D and H. In this manner, the message MA can travel from A to D and the message MB can travel from B to H. The logic associated with A is incapable of routing MA to either D or H. Similarly, logic associated with B is able to route a message MB from B to C and logic associated with C can route MB to either node D or node H. So that while the message MB is able to travel from B to D or from B to H, the logic associated with node B is not capable of routing message MB to either node D or node H.

Figure 5:
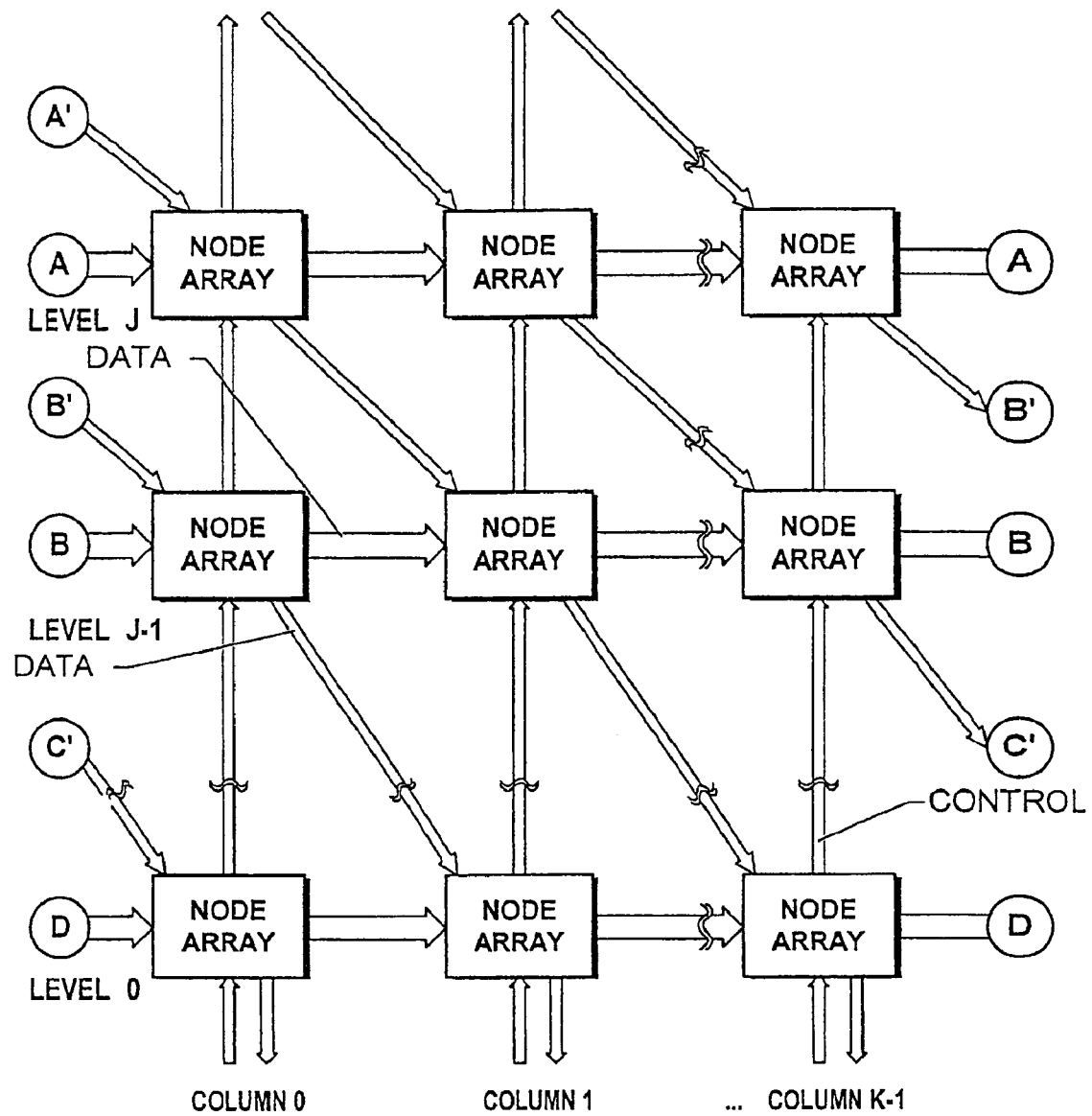
FIG. 5 illustrates an interconnect block diagram to show interconnection of various nodes within the interconnect structure of the present invention.

FIG. 5 is a block diagram of a portion of a network described in the Hesse Patent. Nodes are arranged in arrays. The node arrays are arranged into rows and columns. Node arrays in the rightmost column are connected back to node arrays in the leftmost column at the same level so that, for example the output B of column K-1 of level J-1 forms the input B of column 0 of level J-1. In FIG. 4, the node A is a node in the array in level N+1 of column M, B is in a node array of level N of column M, C is in a node in the node array on level N of column M+1, D is in the node array in level N in column M+2, and H is a node in the node array on level N-1 in column M+2. Each of the FIGS. 1, 2, 3, 4, 6, 7 and 8 show connections between individual nodes that are members of node arrays as illustrated in FIG. 5.

Figure 6A:
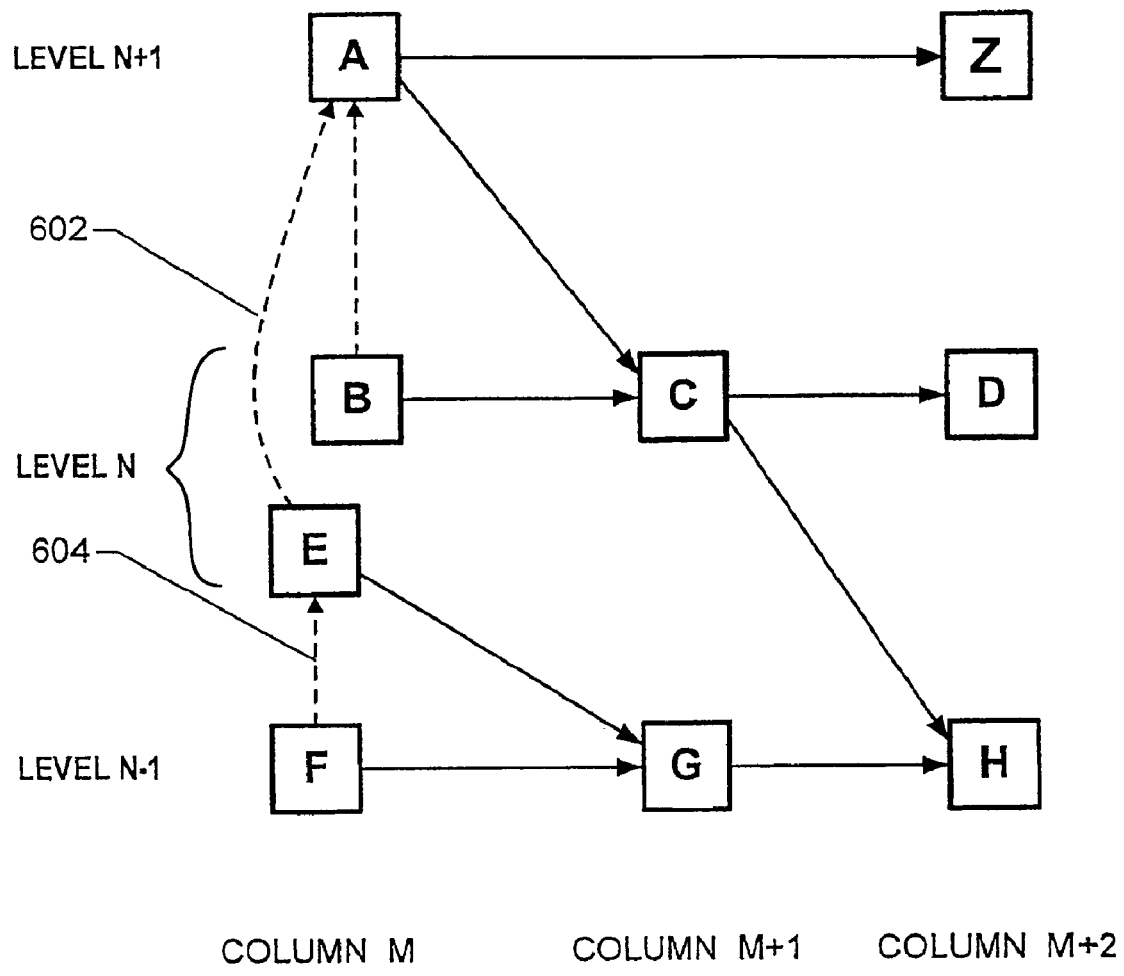
FIGS. 6A and 7 illustrate interconnection of control and message lines between various nodes.
Figure 6B:
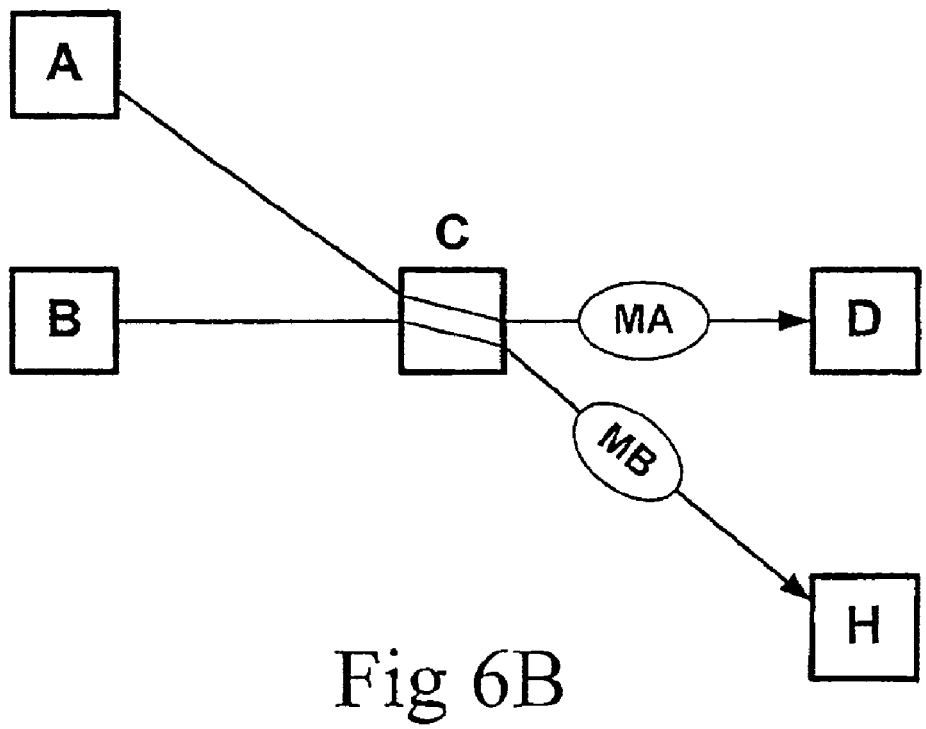
FIGS. 6B and 6C illustrate interconnections between nodes in a portion of an interconnect structure and show data paths through one of the nodes.
Figure 6C:
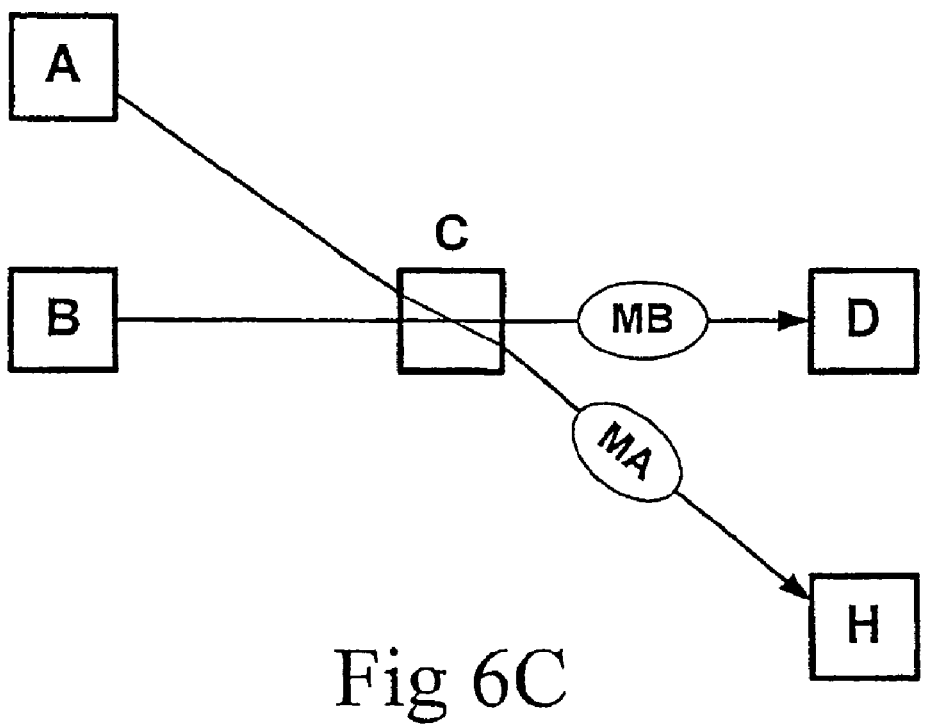

Eight nodes are illustrated in FIG. 6A, which is a further description of an embodiment of the invention. In addition to the five nodes in FIG. 4, there is an additional node E on level N, and two additional nodes F and G on level N-1. E can send a message to G, F can send a message to G, and G can send messages to H.

In a preferred embodiment of the Reed Patent, nodes read only one address bit in the header. Consider a message MB at node B and suppose that B sends MB to C. Then because B and C are on the same level, C will read the same header address bit of MB that B reads. The topology of the network is such that the logic of B could determine if H is on a path to a target of MB. This is because a single address bit of MB determines whether H is on a path to a target of MB; and that address bit is the same bit that is read by the logic for node B. It is also the same bit that will be read by the logic for node C, when MB arrives at C. If H is on a path to a target of MB and there is no message distinct from MB arriving at H at the same time that MB would arrive there, then MB would travel first from B to C and then from C to H, as illustrated in FIG. 6B. Messages arriving at H at the same time as MB would arrive must come from either E or F. If there is no such message M arriving at E or F then it is certain that MB would travel from B to C and then from C to H.

There is already a control signal line from F to E 604 that indicates if there is a message traveling from F to G. With the present invention but not in the Reed and Hesse patents, there is an additional control line 602 from E to A.

The logic at A operates as follows. A message MA arrives at node A. Node A reads one header bit of MA. If that header bit indicates that there is a path from C to a target of MA then A will send MA to C provided that either:

1) there is no competing message sent from B to C; or
2) there is a message MB that will arrive at C in the same time period as the arrival of MA at C, and message MB is guaranteed to travel from C to H, advantageously not using the link from C to D.

The control signal from B to A indicates whether or not B is sending a message to C, and additionally if there is a path from H to a target output port of MB.

The control signal from F to E indicates whether or not F is sending a message to G. The control signal from E to A indicates whether or not either of E or F is sending a message to G. Node A advantageously is provided with all the information it needs to determine where to send MA. Specifically:

1) if the control signal from B to A indicates that there is no competing message being sent from B to C, and if there is a path from C to a target of MA, then A will send MA to C; or 2) if the following conditions are met than A will send MA to C:

the control signal from B to A indicates that there is a message MB at B and there is a path from H to the target output of MB; and the control signal from E to A indicates that there is no competing message being sent from E to G or from F to G, whereby node A determines that MB will travel from C to H, thereby not using the path from C to D for MB, and there is a path from C to a target output port of MA.

3) otherwise, A sends MA to a node Z distinct from C that is on the same level as A.

In case two messages MA and MÁ arrive simultaneously at Node A, then one of the two messages is sent to C according to the above logic, and the remaining message is sent to node Z, distinct from C. In this way, there are messages that advantageously drop down a level with the present invention that would not drop down a level in the Reed and Hesse patents. A feature of the above logic is that whenever two messages arrive simultaneously at a node, at least one of those messages will be allowed to drop to a lower level.

Notice that the multi-bit messages pass through ode A without buffering. Therefore, there is a fixed maximum time T so that any message arriving at node A will leave node A within time T of its arrival at node A. Notice also that the control information carried by line 602 (FIG. 6A) concerns the routing of messages through the nodes E and F and is, therefore, not determined by the messages arriving at node A.

Figure 7:
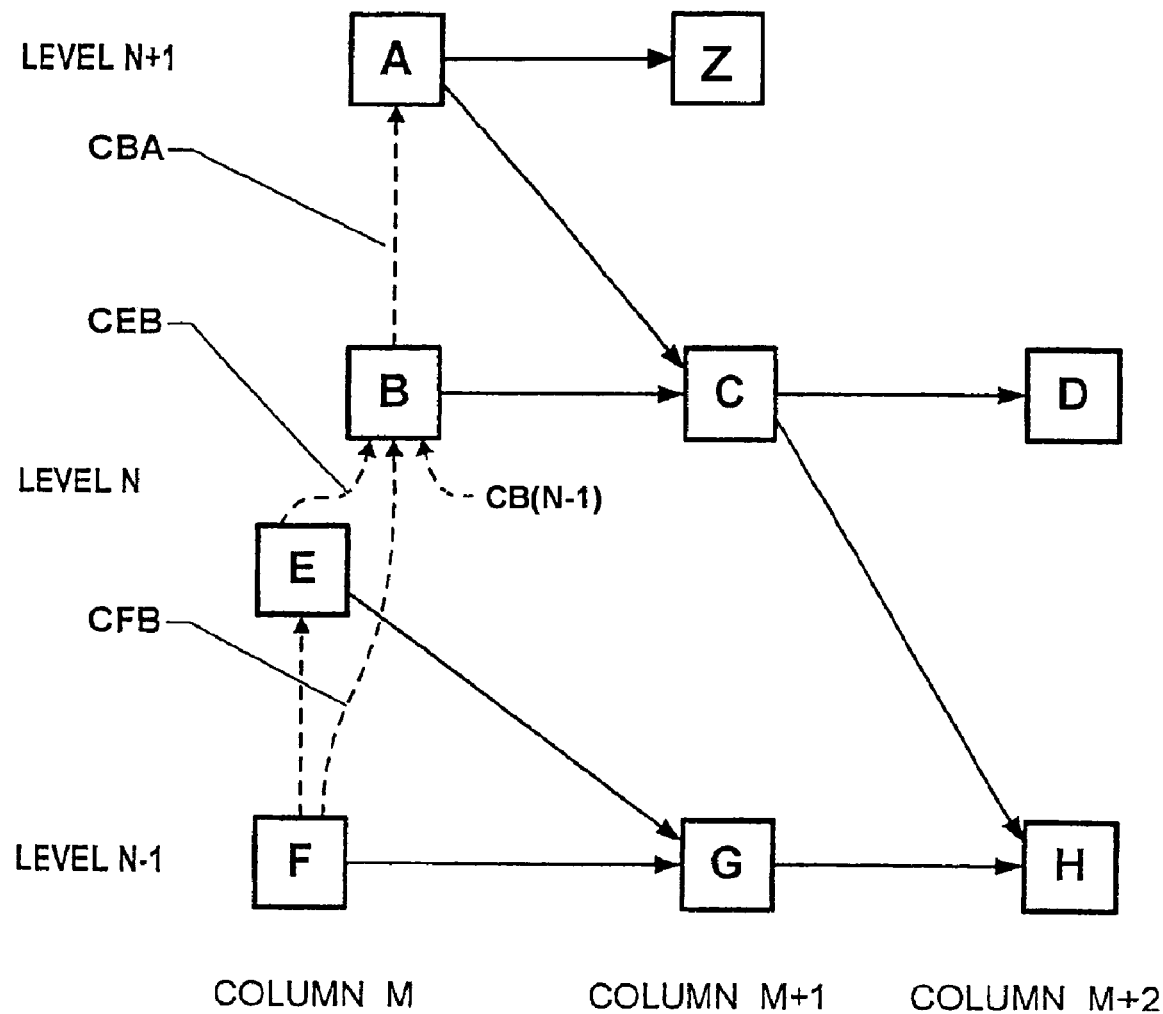

FIG. 7 has the same nodes as FIG. 6A but instead of the control line from E to A, has a control line CFB from F to B and an additional control line CEB from E to B. The control line CFB sends information from F to B in the form of a single bit x. The bit x is set to zero provided that the logic at F determines that there is no message being sent from F to G that could arrive at H in the same time period as a message traveling from B to H. F can set x to zero provided that either:

1) no message is being sent from F to G, or
2) it is guaranteed that a message sent from F to G will be sent from G to a node distinct from H.

Control line CEB from E to B sends information in the form of a single bit y. Bit y is set to zero if E is not sending a message from E to G that could arrive at H at the same time as a message traveling from B to H.

Node B does not use the information contained in the bits x and y in order to determine where to send its messages; it uses information from still another control line CB(N-1) from a node on level N-1 in order to determine where to send its own message. Node B uses the information in lines CEB and CFB in order to be able to send a control signal to A using the control line CBA. Node B sends a single bit z on the control line CBA. Assume that exactly one message MA arrives at node A. Then MA is sent from node A to C, provided that the bit z is zero and C lies on a path to a target of MA. The bit z is set to zero provided that either:

1) B sends no message MB from B to C in a time period that could cause a collision with a message MA from A, or
2) B sends a message MB to C, and based on the information contained in x and y, and in the header of MB, the logic at B determines that it is guaranteed that MB will travel from C to H.

Node A is able to route an incoming message MA based on the header of MA and on the value of the single bit z. In case two messages MA and MÁ arrive simultaneously at A, then one of those two messages is sent to C according to the above logic, and the other message is sent to a node distinct from C such as node Z. A feature of the above logic is that one of the two messages MA and MÁ will be allowed to drop to C. In particular, the messages MA and MÁ are not routed to the same output port of A.

It is important to note that nodes in accordance with the present embodiment are able to route messages based on one header address bit and on control bits from lower levels. In this way the timing is the same as the timing in the Reed and Hesse patents. Importantly, with the embodiment of FIG. 7, node A is able to send a message to C in a case where node A using the logic of FIG. 6A was not able to send a message to C but instead sent its message to a node on level N+1 such as node Z.

In the Reed and Hesse patents and in the material so far described herein, nodes read the bit of the header that indicates that a message is present and they read one additional header address bit. They may also read additional bits such as quality of service bits. In accordance with a further embodiment of the invention nodes may also read multiple address bits.

Referring to FIG. 6A, in an alternate embodiment the nodes read two address bits in the message header. Consider the case when a single message MA arrives at A with a target path that includes H, and a message MB arrives at B with a target path that does not include H, and where B must send MB to C, and hence to D. The structure shown in FIG. 6A (and earlier FIGS.) allows message MA to "cross over" message MB at node C, such that the path of MA goes through nodes A, C, and H, and the path of MB goes through the nodes B, C, and D, as illustrated in FIG. 6C. An objective of this embodiment is to provide the nodes with information needed to determine when a message MA is permitted to cross over a competing message MB which passes through a common node C at the same time. A message MA arrives at node A which reads one header bit that indicates whether or not there is a path through C to a target of MA. Node A also reads an additional header bit that indicates if there is a path through H to a target of MA. The control signal from E to A guarantees that no message from E or F will arrive at H at the same time as MA. The control signal from B to A indicates if there is a message MB at B that will arrive at C at the same time as the message MA and, if so, whether MB is guaranteed not to pass through H. Based on these control signals, node A sends a message MA to C provided that at least one of the following conditions is satisfied:

1) if the path from C to D is known to be free and there is a path through C to a target of MA; or 2) if the path from C to H is known to be free, there is a path from H to a target of MA, and there is no message from E or F that can arrive at H concurrently with the arrival of MA at H.

The first condition (1) above, is discussed above, and the second condition pertains to the "cross over" case. If neither of the above conditions is satisfied, then A will send MA to a node other than C such as Z, which node will be on level N+1. The case in which two messages MA and MA appear simultaneously at node A is handled as described above. Reading two header bits allows us to detect condition (2) above. This sometimes allows the sending from A to C of a message MA that would have stayed on the same level as A under the earlier embodiment of FIG. 6A. The reading of two header address bits requires only minor modifications to the control logic and control signals of the networks described herein and in the Reed and Hesse patents. Such modifications would be apparent to one skilled in the art of this invention and thus further description of such modifications will not be presented herein.

Note that in FIG. 7, node A can send data to node H via node C, while node F can send data to node H via node G. The control signals CFB and CBA enforce a priority of the transfer of data from F to H over the transfer of data from A to H.

Figure 8:
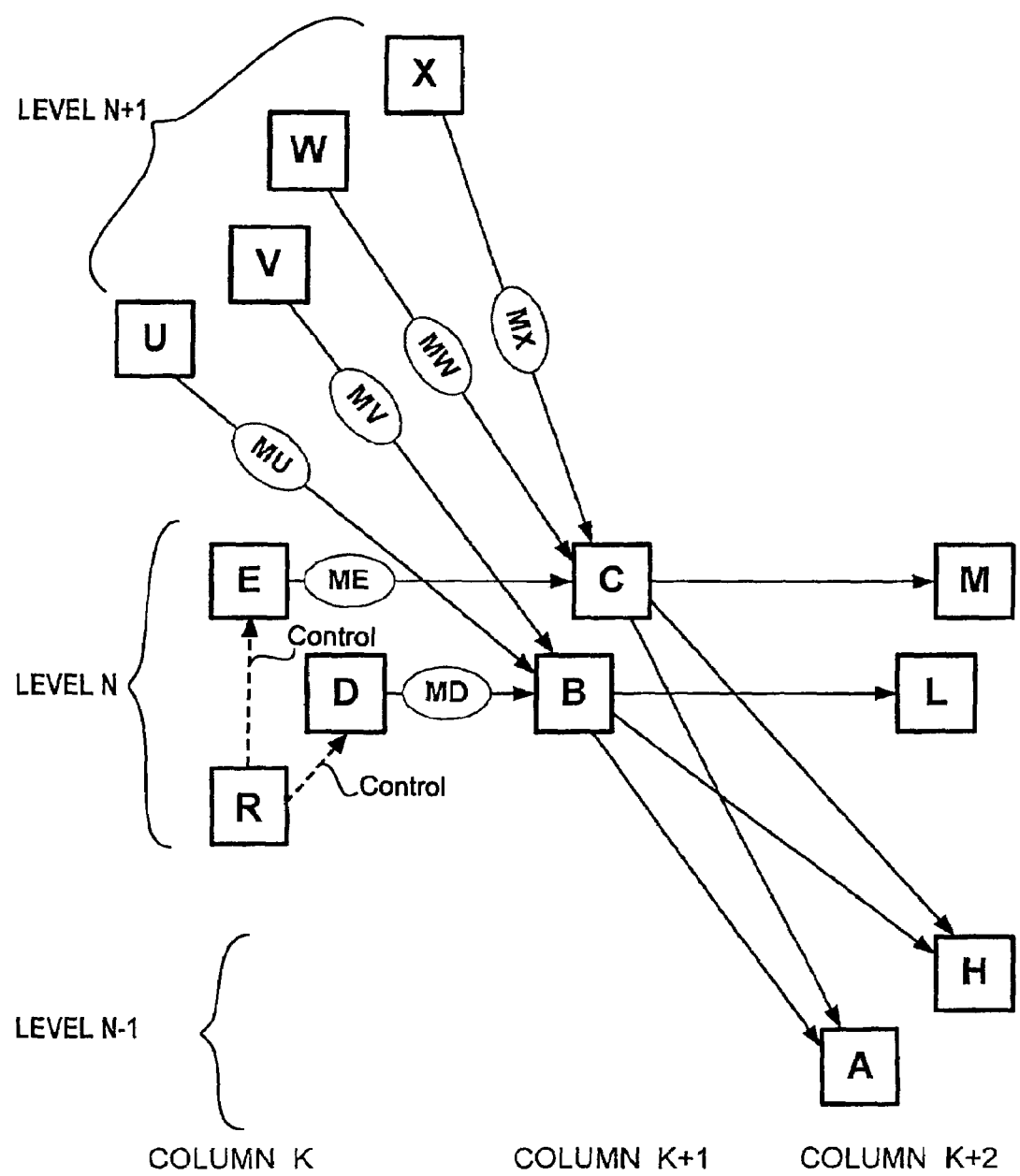
FIG. 8 illustrates an alternative arrangement of cell nodes in accordance with one embodiment of the present invention.

Refer now to FIG. 8. The nodes A and H of FIG. 8 are on level N−1 in column K+2. The nodes B and C at level N of column K+1 are positioned to send data directly to A and H. The nodes U and V of level N+1 in column K are able to send data directly to B, and the nodes W and X of level N+1 in column K are able to send data directly to C. The node B receives data directly from the node D at level N and sends data directly to node L at level N. The node C receives data directly from the node E at level N, and sends data directly to node M at level N. A collection R of nodes in column K are capable of sending control signals to nodes D and E. Node D uses information from a node in R and node E uses the identical information from node D. The control information that node D receives from a node in R enables node D to determine if the paths from node B to node A and node H are unblocked.

FIG. 8 illustrates a portion of a data interconnect structure where each node C on a given level N is positioned to receive data from two nodes on level N+1 and one node on level N, and is also positioned to send data to two nodes on level N−1 and one node on level N. Networks with this data interconnect structure are referred to in the Reed Patent as the Multiple Interconnection to the Next Level Embodiment and in the Hesse Patent as the Flat Latency Embodiment. The control interconnect is described in the Reed and Hesse Patents, the teachings of which are incorporated herein by reference.

In the present invention, the data interconnect structure is as described in the Reed and Hesse Patents, but the nodes are more sophisticated in that they receive and process more control information in order to increase throughput and achieve lower latency. Since the nodes are unbuffered, messages entering a node must be capable of leaving the node immediately and proceed to another node that is in route to a target output. Whenever two messages leave a node, one must continue along the same level and one must drop a level. The correct operation depends upon priority rules enforced by control signals. We will consider the simple case where each node reads only one target header destination bit. This implies that no node on level N can simultaneously receive two messages from nodes on level N+1. We will see that it will also be the case that when a level N node receives two messages, then the message arriving from the same level N can and will always be sent down to a node on level N−1.

Node B has priority over node C to send data to nodes A and H. Node D has priority over nodes U and V to send data to node B, and node U has priority over node V to send data to node B. Similarly, node E has priority over nodes W and X to send data to node C, and node W has priority over node X to send data to node C. In a manner similar to the other examples in accordance with this invention, at a given time period, control signals enter nodes D and E from nodes on column K. At the same time, messages may enter nodes D and E. Based on the possible messages entering node D, and the control signals node D receives, node D may or may not send a message to node B. At the proper time, node D sends a control signal to nodes U and E indicating that either: 1) no message has been sent from node D to node B; 2) a message MD has been sent to node B, and when MD arrives at node B, node B will direct MD to node A; 3) a message MD has been sent to node B, and when MD arrives at node B, node B will send the message MD to node H; or 4) a message MD has been sent to node B, and it is possible that the message MD will travel from node B to node L. In cases 1, 2 and 3, if there is a message at MU at node U, such that MU can reach its target through node B, then the message MU will be sent to node B, and no message from node V will be allowed to travel to node B. If one of the cases 1, 2 or 3 holds, and node U does not send a message to node B, then node V will be "invited" to send a message to node B. That is to say, if node U does not send a message to node B, then node U will so inform node V by means of a control signal, and if there is a message MV at node V that can reach its target through node B, then node V will send MV to node B. In case 2, as in the single down cases already covered, node D is able to predict that node B will route message MD to A based on the information that no other message will arrive at A at a time to conflict with the arrival of MD at A and there is a path from A to a target output port of MD. A similar situation exists for case 3. In the present invention if cases 2 or 3 hold, and either U or V sends a message to B, then B will receive two messages. This is in contrast to the Reed and Hesse patents where only one message can be sent to B in a given time period.

Based on the possible messages entering node E, and the control signals that E receives, E may or may not send a message to node C. The control signal from D to E does not influence the routing of messages by node E, but may influence the control signals that E sends to node W. At the proper time, the logic associated with node E ascertains that one of the following conditions holds: 1) E sends no message to node C; 2) E sends a message ME to C, and when ME arrives at C, C will send ME to A; 3) E sends a message ME to C and when ME arrives at C, C will send ME to H; 4) E sends a message ME to C and the possibility exists that C will route ME to node M. The control signal from D to E is used by the logic associated with C to predict the routing of ME by C. This is because it is not allowed for both B and C to route to node A, nor is it allowed for both B and C to route to node H. When a condition 1, 2 or 3 holds, node E sends a non-blocking control signal to node W giving W permission to route to node C. In case 4, node E sends a blocking control signal to node W and W sends a blocking control signal to X and neither W nor X sends a message to C. In case node W receives a non-blocking control signal from E and W receives a message MW at the correct time and there is a path through C to a target of MW, then W will send MW to C and send a blocking control signal to X prohibiting X from sending a message to C. In case node W receives a non-blocking control signal from node E, and W does not send a message to C then W sends a non-blocking control signal to X. In the presence of the non-blocking control from W, if X receives a message MX at the proper time, and there is a path from C to a target output of MX, then X will send MX to C.

The Reed and Hesse Patents essentially looked one step into the future. The two embodiments presented in this invention look two steps into the future. One skilled in the art can use the techniques presented here to look still further into the future.

There are some trade offs here. As the nodes become more complex, the throughput per step is increased, and the total average steps through the structure is reduced, but the number of nodes that can be placed on a chip is reduced and the time per step may be increased. The Hesse Patent taught the design of an electronic switch that carries headers driving an optical switch that carries payloads. In this invention, it makes sense to spend more on the logic of the electronics and, therefore, this invention can be used as an alternative to implementing the switch disclosed in the Hesse Patent.

U.S. patent application Ser. No. 09/693,359, entitled "Scaleable Multipath Wormhole Interconnect," naming John Hesse as inventor, and filed on even date herewith, taught how to effectively use quality of service information in message headers. The teachings of U.S. patent application Ser. No. 09/009,703, are hereby incorporated herein by reference. The techniques taught in that patent application can be effectively applied to this invention, so that if, for example, the control signal from node D informs nodes U and V that one of node U and node V can send a message to node B, then the rules above will apply unless there is a low quality of service messages MU at node U, such that there is a path from node B to a target output port of MU and a high quality of service message MV at node V, so that at node B there is a path from node B to a target output port of MV. In this case, MV will be sent to node B and MU will be sent to a level N+1 node in column K+1. Quality of service header bits can also be used to determine the priority of messages arriving at nodes D and E.

The invention includes two embodiments that make use of more control information and more sophisticated nodes to improve the performance of the two preferred embodiments. It will be clear to one skilled in the art that these techniques can be applied to other interconnect structures.

While the interconnect structures illustrated and described herein are the preferred embodiments of the invention, it will be understood that changes in both node construction and the interconnect construction may be made without departing from the spirit of the invention or eliminating any of the advantages of the invention as determined by the scope of the appended claims.

We claim:

1. An interconnect structure comprising:
   a plurality of interconnected nodes including a first node having first and second input ports and first and second output ports;
   all output ports accessible from the first input port being accessible from the second output port;
   a plurality of output ports that are accessible from the second input port but not from the first output port; and
   a routing logic included within the interconnect structure to assure that when a second message arrives at the first input port and simultaneously a first message arrives at the second input port there is a path through the second output port to a target destination for the first message;
   wherein at least one of the plurality of nodes is adapted to simultaneously receive a plurality of messages;
   wherein said routing logic assures that the first message is not blocked from using the first output port and the second message is not blocked from using the second output port; and
   wherein said routing logic for the routing of the first and second messages depends in part on QOS criteria.

2. An interconnect structure comprising:
   a plurality of interconnected nodes including the first, second, third, fourth, and fifth nodes, each of the first, second, third, fourth and fifth nodes having a plurality of input ports and a plurality of output ports, and the third node being positioned to receive messages from the first and second nodes and to route messages to the fourth and fifth nodes;
   a plurality of interconnect structure output ports including an output port that is accessible from the third node but not the fifth node;
   a routing logic included within the interconnect structure to assure that when the first node sends a first message to the third node and concurrently the second node sends a second message to the third node, then the third node can route a first message through the fourth node to a target interconnect structure output port for a first message and the third node can route a second message through the fifth node to a target interconnect structure output port for the second message;
   wherein at least one of the plurality of nodes is adapted to simultaneously receive a plurality of messages;
   wherein said routing logic assures that the second message is not blocked from the fifth node and the first message is not blocked from the seventh node; and
   wherein said routing logic is responsive to QOS criteria.

3. An interconnect structure, comprising:
a plurality of interconnected nodes, including a first node and a second node;
the first node having a plurality of data input ports, a plurality of data output ports, and a control signal input port; and
the second node having a plurality of data input ports, a plurality of data output ports, and a control signal output port; and
a routing logic associated with the nodes, the routing logic for routing data selectively among the interconnected nodes;
the first and second nodes being positioned in the interconnect structure so that the first node cannot route data to the second node, the second node cannot route data to the first node, and no node exists in the interconnect structure that can have data routed directly to it from both the first node and the second node;
a logic included as part of said routing logic and associated with the first node that uses information concerning routing of data through the second node to route data through the first node;
wherein at least one of the plurality of nodes is adapted to simultaneously receive a plurality of messages;
the plurality of interconnected nodes further including a third node distinct from the first and second nodes, the third node having a plurality of data input ports, a plurality of data output ports, and a control signal output port; and
the first and third nodes are positioned in the interconnect structure so that the first node cannot route data to the third node, the third node cannot route data through the first node, and no node exists in the interconnect structure that can receive data directly routed both from the first node and the third node;
the logic associated with the first node uses information concerning routing of data through the third node to route data through the first node;
the plurality of interconnected nodes further including a fourth node distinct from the first, second, and third nodes, the fourth node having a plurality of data input ports, a plurality of data output ports, and a control signal output port; and
a logic associated with fourth node included as part of the routing logic being capable of sending a first control signal to the first node, the first control signal containing information concerning routing possibilities through the fourth, third and second nodes and the logic associated with the first node for routing of data through the first node depending at least in part on information concerning routing of data through the fourth, third and second nodes; and
the plurality of interconnected nodes including a fifth node distinct from the first, fourth, second, and third nodes, the fifth node having a plurality of data input ports, and a plurality of data output ports;
the fourth node sends a message to the fifth node;
the second node sends a second control signal to the fourth node;
the third node sends a third control signal to the fourth node;
the logic associated with the fourth node sends a non-blocking first control signal to the first node based on the third and second control signals;
the first node sends a message to the fifth node; and
the fifth node simultaneously receives messages into all of its input ports.

4. An interconnect structure for carrying message packets consisting of a header and a payload with header indicating a target output port comprising:
a plurality of interconnected nodes including a first node having first and second input ports and first and second output ports;
a plurality of output ports that are assessable from the first input port but not from the first output port; and
a routing logic included within the interconnect structure to assure that when a first message arrives at the first input port and simultaneously a second message arrives at a second input port there is a path through the second output port to a target destination for the first message and a path through the first output port to a target destination for the second message,
wherein said routing logic assumes that the second message is not blocked from using the first output port and the first message is not blocked from using the second output port.

* * * * *